Aug. 29, 1961     B. SCHLESSEL     2,998,568
TIME FREQUENCY ANALYZER
Filed April 3, 1956
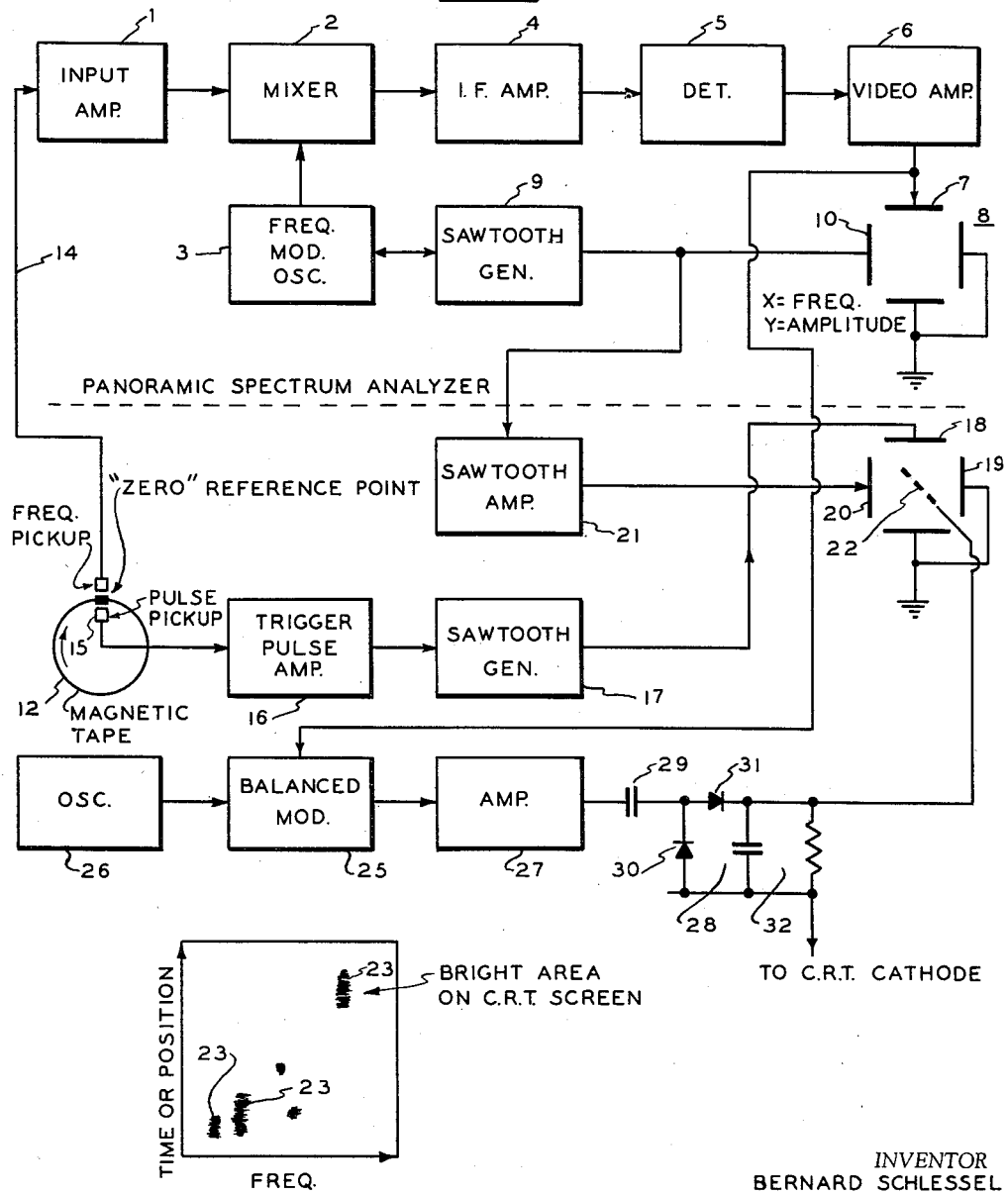
INVENTOR
BERNARD SCHLESSEL
BY *Hyman Hurwitz*
ATTORNEY … # 2,998,568
TIME FREQUENCY ANALYZER
Bernard Schlessel, Brooklyn, N.Y., assignor to Panoramic Radio Products, Inc., Mount Vernon, N.Y., a corporation of New York
Filed Apr. 3, 1956, Ser. No. 575,728
3 Claims. (Cl. 324—77)

The present invention relates generally to data reduction systems, and more particularly to systems for plotting the frequency content of a recurrent signal train as a function of time position within the train. More particularly, the present invention relates to a system in which recurrent frequency data is analyzed for the occurrence of specific frequencies, and a plot generated showing the frequency content of each element of the data, in correlation with an identification of the time position of that element within the data.

In terms of a specific embodiment of the invention, frequency data may be made available repeatedly and periodically, as a function of time. The data may be panoramically frequency analyzed, by means of an analyzer which examines one frequency channel or increment of frequency per repetition of the data. The output of the analyzer may be plotted on one coordinate axis, in synchronism with data scan, plots corresponding with different frequencies or frequency increments being displaced in a second coordinate direction.

The process involves a rapid scan on a time axis, in order to detect the presence of one specific frequency or frequency increment in the recording and to indicate the time position of occurrence of that frequency on a linear trace extending in one coordinate direction, followed by further time scans indicated as linear traces which are progressively displaced in a second coordinate direction, and which indicate the presence and time positions of further frequency increments. The time scanning process is repeated for each frequency or frequency increment in a frequency band, to complete an analysis, the resultant plot being of time position along the recording in one axis, and of frequency in the other. Visual intensities of the plot may represent amplitudes of plotted values.

It is an important feature and advantage of the present invention that it enables employment of a standard spectrum analyzer to develop data required for generation of signals capable of providing a frequency plot, a minimum of supplementary equipment being required to utilize the signals in any event available in such conventional spectrum analyzers, to generate plot of time versus frequency.

The supplementary equipment includes a cathode ray tube indicator in which the frequency analysis provided by the conventional spectrum analyzer is repeated, but in converted form, i.e. as a plot of intensity versus frequency, and in which provision is made for varying the vertical position of the latter plot as a function of time in synchronism with the progress of a time varying signal giving rise to the spectrum.

It is, accordingly, a primary object of the present invention to provide a system for generating a plot of frequency versus time, of a time varying signal having a spectrum of frequencies available at each time position thereof.

It is a more specific object of the present invention to provide a plot in two coordinates, in response to frequency analysis of a recurrent signal train, representative of frequency in one coordinate, and of time position in the train as another coordinate.

It is a further object of the present invention to provide a system for generating a plot of frequency versus time in which is provided successive plots of time positions of adjacent frequency components in a recurrent signal train.

Still another object of the present invention resides in the provision of a system for plotting in successive lines the time positions of different frequencies present in a recurrent periodic train of signals, each line indicating the presence of one frequency or frequency increment, and of the time position in the periodic train of signals of such frequency or frequency increment.

The above and still further objects, features and advantages of the present invention will become apparent upon consideration of the following detailed description of one specific embodiment thereof, especially when taken in conjunction with the accompanying drawings, wherein:

FIGURE 1 is a view in functional block diagram of a system in accordance with the present invention; and FIGURE 2 is a plot of frequency versus time, as generated by the system of FIGURE 1.

Referring now more particularly to the accompanying drawings, the reference numeral 1 denotes a panoramic spectrum analyzer, of conventional character per se, but having a frequency scan extending over a long time period. The panoramic spectrum analyzer 1 may include an input amplifier, capable of amplifying the entire band of frequencies required to be analyzed. The amplifier 1 provides signal to a mixer 2, associated with a frequency modulated local oscillator 3. The frequency converted output of mixer 2 is supplied to an intermediate frequency amplifier 4, having the selectivity required to provide the frequency resolution required of the system. The amplified I.F. signal is detected in a detector 5, the detected output of which is amplified in a video amplifier 6, and applied to the vertical deflection electrodes 7 of a cathode ray tube indicator 8, conventionally illustrated.

The frequency of the frequency modulated local oscillator 3 is varied over a desired range of values in response to a saw-tooth voltage supplied by a saw-tooth generator 9, which may be freely running, and which may have a long repetition period of the order of seconds. The saw-tooth voltage output of saw-tooth generator 9 is applied both to frequency modulated oscillator 3, and to the horizontal deflection electrodes 10 of cathode ray tube indicator 8.

Repetitive horizontal scans are thus generated, of the beam of the cathode ray tube indicator, resulting in repetitive horizontal scans of a visual indication across the face of the indicator. The horizontal scans are vertically modulated by the video signals supplied to the vertical plates 7, and since the acceptance frequency of the system, as determined by the local oscillator frequency, varies in synchronism with the horizontal scan of the visual indication, a plot of amplitude versus frequency is generated on the face of the cathode ray tube indicator.

Panoramic spectrum analyzers of the type and character hereinabove described are presently standard articles of commerce, and are well understood by those skilled in the pertinent art. Design considerations pertaining to such equipment has been described in detail, in an article by Thomasson, published in the Journal of the British Institution of Radio Engineers, July-August 1948, pp. 171–189.

In accordance with the present invention, a source of repetitive signals is provided which may include any signal in the frequency spectrum analyzable by panoramic spectrum analyzer 1, the specific frequency content varying as a function of time. For example, a signal may be recorded on a magnetic tape, or on film, or in any other equivalent fashion. Or the signal may be derived from a rotating mechanical element, such as a shaft, turbine wheel, or the like, as the audio product of its rotation. It is required, at least in a preferred embodiment of the invention, that the signal be periodic, or recurrent in equal times. Suitable means may be provided for translating the signal, which is applied to the input of the panoramic spectrum analyzer.

Assuming for the sake of example, that the source of recurrent periodic signal is a recording or an endless magnetic tape loop, such a tape is indicated at 12, and is assumed to pass through its period rapidly, in comparison with the period of the frequency scan of the spectrum analyzer 1. More particularly one period of the recurrent signal takes place while the spectrum analyzer varies its acceptance frequency by one small increment of frequency, or frequency channel, where the width of the channel is, approximately at least, equal to the visual resolution of the spectrum analyzer. Accordingly, the spectrum analyzer provides a visual analysis of all frequencies present on the magnetic tape. The signal content of the tape 12 may be derived by means of a conventional magnetic tape transducer head 13, and applied to the input circuit of input amplifier 1 by means of a lead 14.

The display provided by the cathode ray tube indicator 8 does not indicate at which point of the recording any specific frequency is present. Stated otherwise, the rotation of magnetic tape 12 generates a repetitive time axis, with respect to any arbitrary initial point in the tape, taken as zero time. The frequencies recorded on the tape 12 occur at definite times with respect to the time axis, but the display provides no indication of time of occurrence of any indicated frequency, but only the information that certain frequencies are recorded on the tape.

Information concerning the times of occurrence of certain frequencies, or of their locations on the tape, may be of great importance. It is a function of apparatus in accordance with the present invention to provide such information. To this end, an initial point is indicated on tape 12, which may be constituted of a pair of slightly separated conductive points, a recording on a synchronously rotating supplementary tape, a light reflective element on the tape for energization of a photocell on passage thereby, an aperture in the tape which permits light to pass to a photo-cell on passage thereby, or any other convenient and conventional device for the purpose, and which per se forms no part of the invention.

The initial point is sensed by a pick-up 15, conventionally illustrated, and applied to synchronize or trigger a pulse generator and amplifier 16. The pulse output of the latter synchronizes a saw-tooth oscillator 17, of relatively short period, which generates a saw-tooth voltage for application to the vertical deflection electrodes 18 of a cathode ray tube indicator 19. Accordingly, vertical scans of the beam of cathode ray tube indicator 19 are produced in synchronism with rotation of tape 12, and each vertical position on the face of the cathode ray tube indicator possesses a time significance, or is representative of a location along tape 12.

Signal is applied to the horizontal deflection electrodes 20 of a cathode ray tube indicator 19, from sawtooth generator 9, via a suitable amplifier 21. The intensity of the beam of cathode ray tube indicator 19 is modulated in response to video signal, derived from video amplifier 6, and applied to intensity grid 22.

Since, in cathode ray tube systems employing electrostatic deflection, the electrodes of the cathode ray tube, i.e. cathode and deflection electrodes, are commonly operated at D.-C. values far removed from ground, the direct coupling of a video amplifier to the intensity control grid circuit is not feasible. Accordingly, the output of video amplifier 6 is applied to a balanced modulator 25, provided with carrier by an oscillator 26. The output of balanced modulator 25 is a carrier suppressed wave, which may be effectively amplified, in a tuned amplifier 27, to a suitably high level, and thereafter detected in a detector circuit 28.

The detector circuit 28 is condenser coupled to amplifier 27, via condenser 29, and includes a parallel diode 30, and a series diode 31, terminating in an RC load circuit 32. The latter is connected between grid 22 of cathode ray tube indicator 19, and the cathode of the latter. The video signal circuit is thereby decoupled for D.-C. from the cathode ray tube electrodes, and the D.-C. level of the latter may be set independently of video circuit design considerations. The use of a carrier suppressed video signal implies that no D.-C. component will be detected, due to carrier level, i.e. that the video signal will be zero, between grid and cathode of the cathode ray tube indicator 19, when the viedo input signal at balanced modulator 25 is equal to zero.

Describing now the operation of the present system, as tape 12 rotates from a starting position, evidenced by signal pick-up device 15, the cathode ray beam of indicator 19 traverses a vertical path. Each vertical position of the beam corresponds with a time position of the signal provided by pick-up 13, as translated by spectrum analyzer 1, and supplied via video amplifier 6 to intensity grid 22. The spectrum analyzer 1 scans in frequency at a sufficiently slow rate that it may be considered to remain at one frequency position while tape 12 passes through a complete cycle of rotation. It follows that a vertical trace is a plot of the presence or absence of one frequency, or of signal in one small frequency increment, against time position of the input signal, or, location on the tape 12. If a frequency falling within the momentary acceptance band is present on tape 12, intensifying signal will be applied to grid 22, and not otherwise. The time position or positions at which that frequency is found, determines the vertical position of the beam of cathode ray tube indicator 19 at which intensification will take place.

The spectrum analyzer 1 is, nevertheless, in process of scanning slowly, and in synchronism with such scan the beam of cathode ray tube indicator 19 is being deflected horizontally. In the course of time, then, the presence of all frequencies susceptible of analysis by the system will be detected, and the time position of each frequency will be represented visually on the face of cathode ray tube indicator 19. The final plot is one of time as ordinate, versus frequency as abscissa, with visual intensity indicative of relative amplitudes of indicated signals.

Reference is made to FIGURE 2 of the accompanying drawings. This figure illustrates a time-frequency plot of the type generated by systems in accordance with the present invention. More particularly, frequency is plotted horizontally and time vertically. The time required to scan the frequency axis is relatively long, and corresponds with the time of scan of panoramic spectrum analyzer 1. The time required to complete a vertical scan is that required to complete one rotation of tape 12. The several indications, as 23, represent in terms of their coordinates simultaneous frequencies and time positions on tape 12 of signals corresponding to the frequencies, and relative intensities of signals are represented in terms of visual intensities of the indications.

In essence, the reproduction of signal magnetically recorded on a continuous loop generates a periodically recurrent signal. Such signals may be derived in many ways, as by means of microphones responsive to the acoustic energy of periodic machinery. The use of magnetic recording possesses the advantage that a non-recurrent phenomenon may be recorded, and thereafter recurrently and periodically reproduced for analysis.

While the preferred embodiment of the present invention is disclosed as providing a plot in rectangular coordinates, polar or other convenient coordinates may be employed, if desired. Further, any one of the coordinate axes may be non-linear, rather than linear, and in particular logarithmic scales may be advantageous, in accordance with principles well known in the art.

While I have described and illustrated one specific embodiment of the present invention, it will become apparent that variations of the specific details of construc-

What I claim is:

1. The combination with a complete and operative spectrum analyzer including a first cathode ray tube indicator having first and second beam deflection means, a source of a periodically recurrent wave train having frequencies within a frequency spectrum, a frequency scanning frequency selective circuit for passing said frequencies in sequence in accordance with the positions of said frequencies in said frequency spectrum, a source of first sawtooth voltage, means responsive to said first sawtooth voltage for effecting frequency scanning of said frequency scanning frequency selective circuit, means for applying said sawtooth voltage to said first beam deflection means, means for applying signal representative of the response of said frequency scanning frequency selective circuit to said second beam deflecting electrodes, of a time frequency plotter comprising a further cathode ray tube having third and fourth beam deflection electrodes and a beam intensifier electrode, means for applying said signal representative of said response of said frequency scanning frequency selective circuit to said intensifier electrode in intensifying relation, means for applying said first sawtooth voltage to said third deflection electrode, means for generating a second sawtooth voltage in synchronism with said periodically recurrent wave train, means for applying said second sawtooth voltage to said fourth deflection electrode, the first sawtooth voltage having a period greater than said second sawtooth voltage.

2. The combination of a complete and operative scanning spectrum analyzer for generating a plot of amplitude versus frequency of a repetitive time function, of an adjunct device for generating a plot of frequency versus time of said time function, wherein said scanning spectrum analyzer includes an input amplifier, a mixer, an I.F. amplifier, a detector and a video amplifier, all connected in cascade, a frequency modulated oscillator coupled to said mixer for heterodyning frequencies contained in said recorded signal to the response frequency of said I.F. amplifier, a free-running source of sawtooth voltage connected to said oscillator for controlling the frequency modulations thereof as a function of the amplitude of said sawtooth voltage, a first cathode ray tube having two ray deflection devices, means for applying said sawtooth voltage to one of said ray deflection devices and means for applying output signal derived from said video amplifier to the other of said ray deflection devices, said I.F. amplifier having a pass band $\Delta f$, and the slope of said sawtooth function being arranged and selected to vary the frequency of said local oscillator over a range not greater than $\Delta f$ for each repetition of said repetitive time function, said adjunct device including a second cathode ray tube having two ray deflection devices and a ray intensity control electrode, a source of further sawtooth voltage having a period equal to and coextensive with the period of said repetitive time function, means for applying said first-mentioned sawtooth to one of the ray deflection devices of said second cathode ray tube, means for applying said output signal derived from said video amplifier to said ray intensity control electrode, and maens for applying said further sawtooth voltage to the other ray deflection device of said second cathode ray tube.

3. The combination of a complete and operative scanning spectrum analyzer for generating a plot of amplitude versus frequency of a repetitive time function, an adjunct device for generating a plot of frequency versus time of said time function, wherein said scanning spectrum analyzer includes an input amplifier, a mixer, an I.F. amplifier, a detector and a video amplifier, all connected in cascade, a frequency modulated oscillator coupled to said mixer for heterodyning frequencies contained in said recorded signal to the response frequency of said I.F. amplifier, a free-running source of sawtooth voltage connected to said oscillator for controlling the frequency modulations thereof as a function of the amplitude of said sawtooth voltage, a first cathode ray tube having two ray deflection devices, means for applying said sawtooth voltage to one of said ray deflection devices and means for applying output signal derived from said video amplifier to the other of said ray deflection devices, said I.F. amplifier having a pass band $\Delta f$, and the slope of said sawtooth function being arranged and selected to vary the frequency of said local oscillator over a range not greater than $\Delta f$ for each repetition of said repetitive time function, said adjunct device including a second cathode ray tube having two ray deflection devices and a ray intensity control electrode, a source of further sawtooth voltage having a period synchronized and co-extensive with the period of said repetitive time function, only three leads extending between said spectrum analyzer and said device for generating a plot of frequency versus time, means for applying said first-mentioned sawtooth to one of the ray deflection devices of said second cathode ray tube via one of said three leads, means for applying said output signal derived from said video amplifier to said ray intensity control electrode via a second of said three leads, means for applying said repetitive time function to said input amplifier via a third of said three leads, and means for applying said further sawtooth voltage to the other ray deflection device of said second cathode ray tube.

References Cited in the file of this patent

UNITED STATES PATENTS

| 2,159,790 | Freystedt | May 23, 1939 |
| 2,403,984 | Koenig | July 16, 1946 |
| 2,403,986 | Lacy | July 16, 1946 |
| 2,403,997 | Potter | July 16, 1946 |
| 2,429,229 | Koenig | Oct. 21, 1947 |
| 2,476,445 | Lacy | July 19, 1949 |
| 2,705,742 | Miller | Apr. 5, 1955 |

OTHER REFERENCES

"Amplitude Cross-Section Representation with the Sound Spectrograph," The Journal of the Acoustical Society of America, November 1948, article by L. G. Kersta, pp. 796, 801.

"The Cathode Ray Sound Spectroscope," article in either of Journal of the Acoustical Society of America, vol. 21, M5, September 1949, pp. 527–537 or Bell Labs. Record, vol. 28, M–6, June 1950, pp. 263–267.